(12) United States Patent
Canter

(10) Patent No.: US 6,316,925 B1
(45) Date of Patent: Nov. 13, 2001

(54) SOLAR ARRAY PEAK POWER TRACKER

(75) Inventor: Stanley Canter, Phoenix, AZ (US)

(73) Assignee: Space Systems/Loral, Inc., Palo Alto, CA (US)

( * ) Notice: Subject to any disclaimer, the term of this patent is extended or adjusted under 35 U.S.C. 154(b) by 1159 days.

(21) Appl. No.: 08/654,763

(22) Filed: May 29, 1996

Related U.S. Application Data

(63) Continuation of application No. 08/357,102, filed on Dec. 16, 1994, now abandoned.

(51) Int. Cl.$^7$ .............................. G05F 1/40; G05F 1/44; G05F 1/56
(52) U.S. Cl. ......................... 323/282; 323/284; 307/66
(58) Field of Search ................................. 323/284, 285, 323/286, 287, 282, 906, 299; 307/66; 455/127

(56) References Cited

U.S. PATENT DOCUMENTS

| | | | |
|---|---|---|---|
| 3,816,804 | 6/1974 | Cardwell, Jr. | 320/9 |
| 4,200,833 | 4/1980 | Wilkerson | 323/20 |
| 4,204,147 | 5/1980 | Larrabee | 323/4 |
| 4,314,198 | * 2/1982 | Rogers | 323/906 |
| 4,375,662 | 3/1983 | Baker | 363/95 |
| 4,404,472 | 9/1983 | Steigerwald | 307/46 |
| 4,571,532 | 2/1986 | Jaster | 320/2 |
| 4,580,090 | 4/1986 | Bailey et al. | 323/303 |
| 4,604,567 | * 8/1986 | Chetty | 323/299 |
| 4,661,758 | 4/1987 | Whittaker | 320/21 |
| 4,695,785 | 9/1987 | Mieth et al. | 323/222 |
| 4,731,870 | * 3/1988 | Black et al. | 455/127 |
| 4,794,272 | * 12/1988 | Bavaro et al. | 307/66 |
| 4,873,480 | 10/1989 | Lafferty | 323/229 |
| 5,027,051 | 6/1991 | Lafferty | 323/222 |
| 5,153,497 | 10/1992 | Eiden | 320/61 |
| 5,327,071 | * 7/1994 | Frederick et al. | 323/906 |

OTHER PUBLICATIONS

"Design and Analysis of a Microprocessor–Controlled Peak–Power–Tracking System", by P. Huynh and B.H. Cho, Virginia Power Electronics Center, Bradley Electrical Engineering Department, Virginia Polytechnic Institute and State University (Aug. 1992).

* cited by examiner

Primary Examiner—Peter S. Wong
Assistant Examiner—Bao Q. Vu
(74) Attorney, Agent, or Firm—Perman & Green, LLP

(57) ABSTRACT

A method for operating a pulse width modulated switching power converter (1), and a pulse width modulated switching power converter that is constructed to operate in accordance with the method. The power converter has an input coupled to an output of a solar array (10) and an output providing an output current, the output being coupled to battery (14) for applying a charging current $I_{CHARGE}$ to the battery while also supplying a current $I_{LOAD}$ to a load. The method includes the steps of: (a) incrementally increasing (18, C1) a duty cycle of the pulse width modulated switching power converter so as to incrementally increase a magnitude of the output current of the switching power converter; (b) sensing (14a) a first magnitude of both $I_{CHARGE}$ and $I_{LOAD}$; (c) storing (20) the sensed magnitude; (d) sensing a second magnitude of both $I_{CHARGE}$ and $I_{LOAD}$; and (e) comparing (22) the stored first magnitude to the sensed second magnitude. If the stored first magnitude is determined to be less than the sensed second magnitude, the method maintains the duty cycle at a current duty cycle increment. If instead the stored first magnitude is determined to be greater than the sensed second magnitude, the method decreases the duty cycle. The step of incrementally increasing includes a step of periodically increasing the charge upon a capacitance (C1) that is coupled to a control node of the pulse width modulated switching power converter, and the step of decreasing the duty cycle includes a step of at least partially discharging the capacitance.

8 Claims, 4 Drawing Sheets

FIG. 5A

FIG. 5B — VOLTAGE ACROSS C1 / OUTPUT OF OSCILLATOR, 18

FIG. 5C — VOLTAGE AT CONTROL NODE OF BUCK REGULATOR, 12

FIG. 5D — $I_{TOTAL} = I_{LOAD} + I_{CHARGE}$

FIG. 5E — OUTPUT OF ERROR AMP, 22; DISCHARGE C1

SOLAR ARRAY PEAK POWER TRACKER

"This application is a continuation of application Ser. No. 08/357,102 filed on Dec. 16, 1994 now abandoned.

FIELD OF THE INVENTION

This invention relates generally to battery chargers and, in particular, to battery charger power regulators that operate from a solar array and which employ a peak power tracker (PPT).

BACKGROUND OF THE INVENTION:

Battery charger regulation control circuits that force a solar array to operate at a maximum power point of the solar array are generally known as peak power trackers (PPT). PPT circuits have been known for a considerable period of time. However, their general acceptance and widespread use has been hindered by their cost and complexity. One reason for employing a PPT circuit is that the operating characteristics of a conventional photovoltaic solar power array tend to degrade over time. This results in considerably different I-V characteristics at the beginning of the operating life than those exhibited at the end of the operating life.

One significant advantage to using a PPT is the ability to extract the maximum power available from a solar array. Another significant advantage is the ability to extend battery life in the presence of varying battery load or varying solar illumination. This second advantage is made possible by minimizing the depth of the discharge experienced by the battery. Both of these advantages are most beneficial when used in a satellite in a low earth orbit (LEO) that experiences periods of full illumination alternating with eclipse. Thus, despite the added cost and complexity of the PPT, relative to fixed operating point battery charging systems, the use of PPT can be very desirable.

One conventional approach to operating a PPT circuit is known as the disturb and observe approach. In this technique the operating point of the battery charging regulator is offset by some small amount, the power output of the solar array is then determined by multiplying the array output current by the array output voltage, and a search is then made for a maximum in the power output.

A recent example of the disturb and measure approach is described in an article entitled "Design and Analysis of a Microprocessor-Controlled Peak-Power-Tracking System", by P. Huynh and B. H. Cho, Virginia Power Electronics Center, Bradley Electrical Engineering Department, Virginia Polytechnic Institute and State University (August 1992). The authors employ a microprocessor to compute the peak power point. Afterwards, the solar array is forced to operate at a voltage where the output power of the solar array is maximized. The system is said to operate essentially in two different modes: peak-power-tracking (PPT) mode and trickle-charge (TC) mode. As a spacecraft emerges from eclipse, the solar array is regulated at the peak-power voltage (PPT mode) to provide maximum power for the load, and the battery sources or sinks the additional power, depending on the load demand. When the battery is fully charged and the solar array output power exceeds the load power, the PPT system switches to the TC mode. When operating in this mode a small solar array current is used to charge the battery, to compensate for the battery leakage current, while adequate power from the solar array is provided for the load.

Other PPT techniques do not employ a microprocessor, but instead utilize complex analog signal processing which, while eliminating the requirement to provide a programmed microprocessor device, result in considerable complexity and require a significant amount of circuit board area to implement. As is well known, in any earth satellite application the conservation of weight and volume is an important goal.

An object of this invention is to provide a power supply system which provides the benefits of the prior art PPTs, while at the same time doing so at little or no additional cost and complexity, and with a minimized increase in weight and volume.

SUMMARY OF THE INVENTION

The foregoing and other problems are overcome by a method for operating a pulse width modulated switching power converter, and by a pulse width modulated switching power converter that is constructed to operate in accordance with the method. The power converter has an input coupled to an output of a solar array and an output providing an output current, the output current being coupled to a battery for applying a charging current $I_{CHARGE}$ to the battery while also supplying a current $I_{LOAD}$ to a load. The method includes the steps of: (a) incrementally increasing a duty cycle of the pulse width modulated switching power converter so as to incrementally increase a magnitude of the output current of the switching power converter; (b) sensing a first magnitude of both $I_{CHARGE}$ and $I_{LOAD}$; (c) storing the sensed magnitude; (d) sensing a second magnitude of both $I_{CHARGE}$ and $I_{LOAD}$; and (e) comparing the stored first magnitude to the sensed second magnitude. If the stored first magnitude is determined to be less than the sensed second magnitude, the method maintains the duty cycle at a current duty cycle increment. If instead the stored first magnitude is determined to be greater than the sensed second magnitude, the method decreases the duty cycle.

The step of incrementally increasing includes a step of periodically increasing the charge upon a capacitance that is coupled to a control node of the pulse width modulated switching power converter, and the step of decreasing the duty cycle includes a step of at least partially discharging the capacitance.

In this manner the circuit comes to oscillate about a point that corresponds to the peak power point of the solar array, and thus functions as a PPT. Due to the position of the current sensor at the output of the power converter, the circuit always tracks the maximum battery current operating point, even when this point changes due to external factors such as changes in $I_{LOAD}$.

This invention also encompasses an earth satellite comprising at least one solar array, at least one switching power converter, at least one battery that is charged by the at least one switching power converter, and a load. The load may be comprised of a communications package that includes a transceiver coupled to an antenna.

The switching power converter includes a current control loop comprised of a pulse width modulator having an output providing a pulse width modulated signal to a control terminal of a switching device. The switching device is coupled between the at least one solar array and the at least one battery. The current control loop further includes a current sensor coupled to an output of the switching device, the current sensor having an output coupled to an input of the pulse width modulator for causing the pulse width modulator to vary the duty cycle of the pulse width modulated signal in accordance with the sensed current.

In accordance with an aspect of this invention the switching power converter further includes a peak power tracker loop operating in parallel with the current control loop. The peak power tracker loop includes a circuit arrangement for periodically increasing the duty cycle of the pulse width modulated signal so as to periodically increase a magnitude of the output current of the switching device. The peak power tracker loop also includes a sample and hold circuit, having an input coupled to an output of the current sensor, for periodically storing a sample of the sensed current; and further includes a comparator having a first input coupled to the output of the current sensor and a second input coupled to an output of the sample and hold circuit for comparing a value of a previous sample of the sensed current to a value of the presently sensed current. The comparator has an output coupled to an input of the circuit arrangement for periodically increasing the duty cycle of the pulse width modulated signal. The circuit arrangement is responsive to the output of the comparator for maintaining the duty cycle at a current duty cycle increment if the value of the previous sample of the sensed current is indicated to be less than the value of the presently sensed current, and is further responsive to the output of the comparator for decreasing the duty cycle if the value of the previous sample of the sensed current is indicated to be greater than the value of the presently sensed current.

BRIEF DESCRIPTION OF THE DRAWINGS

The above set forth and other features of the invention are made more apparent in the ensuing Detailed Description of the Invention when read in conjunction with the attached Drawings, wherein:

FIGS. 5A–5E are timing diagrams that illustrate the operation of the circuit of FIG. 2.

DETAILED DESCRIPTION OF THE INVENTION

Figures 1, 3:
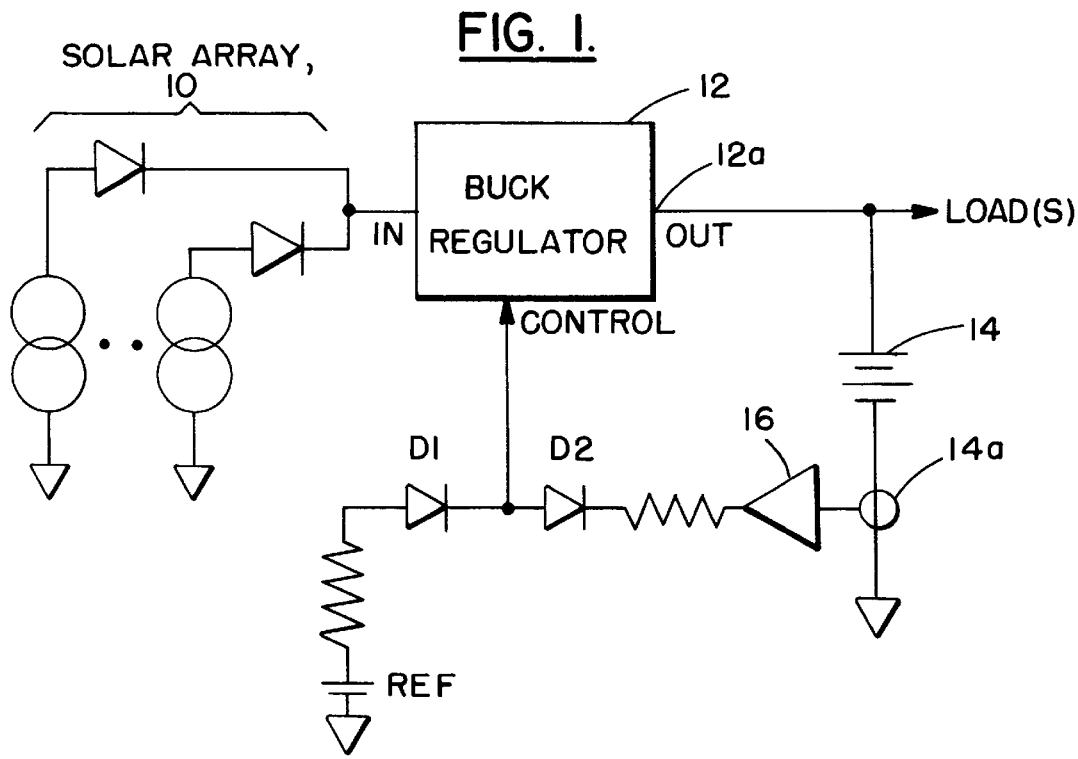
FIG. 1 is a block diagram of fixed-point buck regulator-based battery charging system.
FIG. 3 illustrates in greater detail a portion of the circuitry of FIG. 2.

This invention grows out of a realization by the inventor that in a power supply system of the type depicted in FIG. 1, comprised of a solar array 10, a buck regulator 12, and a battery 14; it is not necessary to track and determine the peak power point of the solar array 10. Instead, it suffices to operate the system so as to maximize the charge current ($I_{CHARGE}$) of the battery 14. This is because the output (12a) of the buck regulator 12 is nearly lossless. As a result, maximizing $I_{CHARGE}$ maximizes $I_{CHARGE}*V_{BAT}$, which because of the assumption that the output 12a of the buck regulator 12 is essentially lossless, also maximizes the output of the solar array 10. Stated differently, this invention seeks to maximize the charge current of the battery 14, and not to operate at a particular point on the power curve of the solar array 10.

FIG. 1 generally illustrates a fixed operating point approach. In this configuration the operating point of the buck regulator 12 is selected and set by a reference potential (REF) such that, at the end of the expected operational life of the solar array 10, the operating point of the buck regulator 12 is close to the terminal peak power point of the solar array 10. During operation the battery current is sensed by current sensor 14a and a sensing circuit 16 which generates a control signal to drive the buck regulator 12. The diodes D1 and D2 enable the REF signal and the control signal to be combined before application to the control terminal of the buck regulator 12. Unfortunately, this fixed operating point approach results in wasting as much as 50% of the available power of the solar array 10 at the beginning of the array's operational life.

Figure 2:
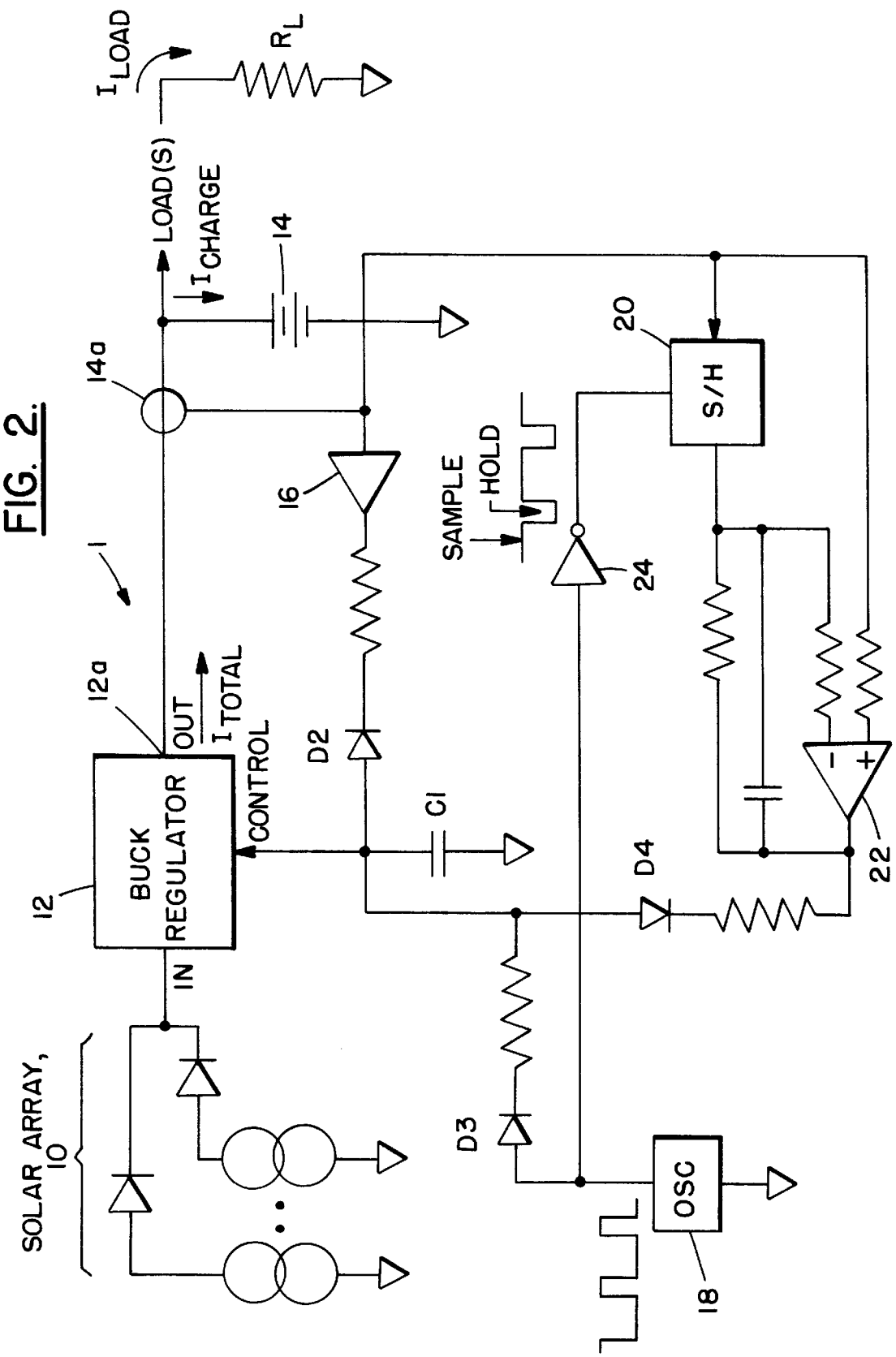
FIG. 2 is a block diagram of buck regulator-based battery charging system that is constructed and operated in accordance with this invention.

FIG. 2 illustrates a battery charging regulator system 1 in accordance with the teaching of this invention. In FIG. 2 the operating point is determined by an additional PPT control loop, operating in parallel with the conventional current sensing circuit 16, that is comprised of an oscillator 18, a sample and hold (S/H) circuit 20, and an inverting error amplifier 22 that functions as a comparator. Diodes D3 and D4, in combination with D2, enable the ORing of signals at the control node of the buck regulator 12. An inverter 24 inverts the output of the oscillator 18 and forms a control signal for the S/H 20. Also, the current sensor 14a is positioned at the output node 12a of the buck regulator 12 so as to sense both the battery charging current $I_{CHARGE}$ and also the load current $I_{LOAD}$. In operation, the PPT control loop functions as follows, wherein reference should also be made to the timing diagram of FIG. 5.

The output of oscillator 18 has a fixed pulsewidth of, by example, 1 mS and period of, by example, 10 mS, and a resulting frequency that is significantly less than that of the pulse width modulated control signal that operates the buck regulator 12. By example, the frequency of the PWM signal may be 50 kHz. It is assumed as an initial condition that the output of the error amplifier 22 is high, thereby reverse biasing D4. Since there is no discharge path for capacitor C1, the oscillator 18 functions as a staircase generator to incrementally increase the duty cycle of the pulse width modulated buck regulator by incrementally increasing the potential across C1.

For each step increase of duty cycle, the error amplifier 22 compares the present magnitude of the battery current and the load current, as output from the current sensor 14a, with the previously sensed total current that is stored in the S/H 20. The inverted oscillator 18 output is used to control the S/H 20 so as to sample the output of the current sensor 14a when the oscillator 18 pulse is not asserted, and to hold the signal for the duration of the pulse.

If the incremental increase in the duty cycle results in a sensed decrease in the total output current from the buck regulator 12, the output of the error amplifier 22 swings negative. This is because the current output of the current sensor 14a will be less than the value stored in the S/H 20. The error amplifier 22 swinging negative forward biases D4, causing C1 to begin discharging through D4, thereby reducing the magnitude of the potential at the control node of the buck regulator 12 and reducing the duty cycle.

The decrease in the duty cycle results in a sensed increase in total current, and the output of the error amplifier 22 swings positive. This is because the current output of the current sensor 14a will again be greater than the value stored in the S/H 20. The error amplifier 22 swinging positive again reverse biases D4, thereby removing the discharge path for C1.

In this manner the circuit will eventually oscillate about a maximum battery charging current value that corresponds to the peak power point of the solar array 10, and thus the circuit functions in a manner analogous to a PPT.

A trickle enable signal is also input to amplifier 16 to override the functioning of the peak power tracking circuits when the battery 14 is fully charged. In the illustrated configuration the output of amplifier 16 is driven more negative by the assertion of the trickle enable signal. This causes C1 to discharge through D2, thus overriding the operation of the oscillator 18, the S/H 20, and the error amplifier 22. The trickle enable signal can be generated by an on-board controller (not shown).

In view of the foregoing it can be appreciated that the circuit of FIG. 2, due to the position of the current sensor 14a, always tracks the maximum battery current operating point, even when this point changes due to external factors such as changes in $I_{LOAD}$. Furthermore, the required circuit bandwidth to track the slowly varying solar array is very low, for example 1 Hz or less. This results in a high circuit tracking accuracy of typically less than 2%.

FIG. 3 illustrates in greater detail the construction of the buck regulator 12. The buck regulator 12 is comprised of power FET 13, inductor L1, catch diode $D_c$, and a pulse width modulator 28 that is transformer coupled (T1 30) to the gate of the power FET 13. In this embodiment the current sensor 14a includes a series sense resistor ($R_{SENSE}$) and a current sense amplifier 26. In other embodiments of the invention a magnetic-type current sensor can be employed in place of the resistor-based current sensor. In accordance with an aspect of this invention the current sensor 14a, e.g., the sense resistor $R_{SENSE}$, is coupled to the output node 12a of the buck regulator 12 and thus senses the total output current that is comprised of both $I_{CHARGE}$ and $I_{LOAD}$.

As an example, the S/H 20 is implemented with a SMP10 device, and the oscillator 18 with a 555 device that is configured as a free running oscillator. The PWM 28 may be a well-known 1825 device. The error amplifier 22 may be an OP27.

Figure 4:
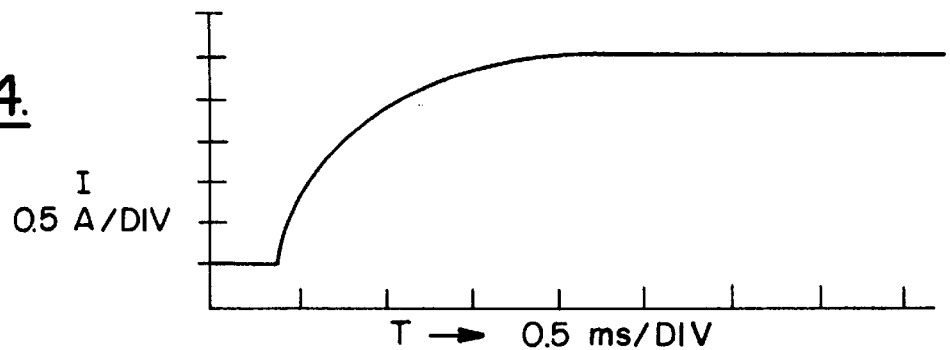
FIG. 4 is a graph that illustrates the operation of the circuit shown in FIG. 2.

FIG. 4 illustrates the rapid risetime of the system of FIG. 2 towards the peak power point. In FIG. 4 the output power is considered to be the output current times the battery voltage, assuming the approximation wherein the converter losses are negligible. The peak power point is reached in approximately three milliseconds after turn on. A significantly longer period of time is required to fully charge the battery 14.

The following Table shows the accuracy of the system of FIG. 2 when used with a 10V simulated battery. The solar array 10 was simulated by a voltage source in series with a resistor, which has the appropriate parabolic power vs. voltage shape. The Bus voltage is the input voltage from the simulated array 10, Iout,pk represents an idealized peak current, Iout,ss represents the actual (measured) current output of the converter circuit of the invention; and delta (D) is the percentage error between the ideal and actual current outputs.

TABLE

| BUS (V) | Iout,pk(A) | Iout,ss,(A) | D (%) |
|---|---|---|---|
| 35 | 2.35 | 2.35 | 0 |
| 40 | 3.04 | 3.04 | 0 |
| 45 | 3.72 | 3.70 | <1 |
| 50 | 4.47 | 4.36 | 2 |
| 55 | 5.29 | 5.07 | 4 |
| 60 | 6.18 | 5.91 | 4 |

At low power levels the error was found to be 0%, increasing to a maximum of 4% at a maximum power level approximately 2.5 times greater than the minimum. This performance is more than adequate for an earth satellite application, because at beginning of the solar array operational life higher power is available, thus a small off-peak error is acceptable, while at the end of the operational life the available power is minimum, and thus greater accuracy is required.

Figure 6:
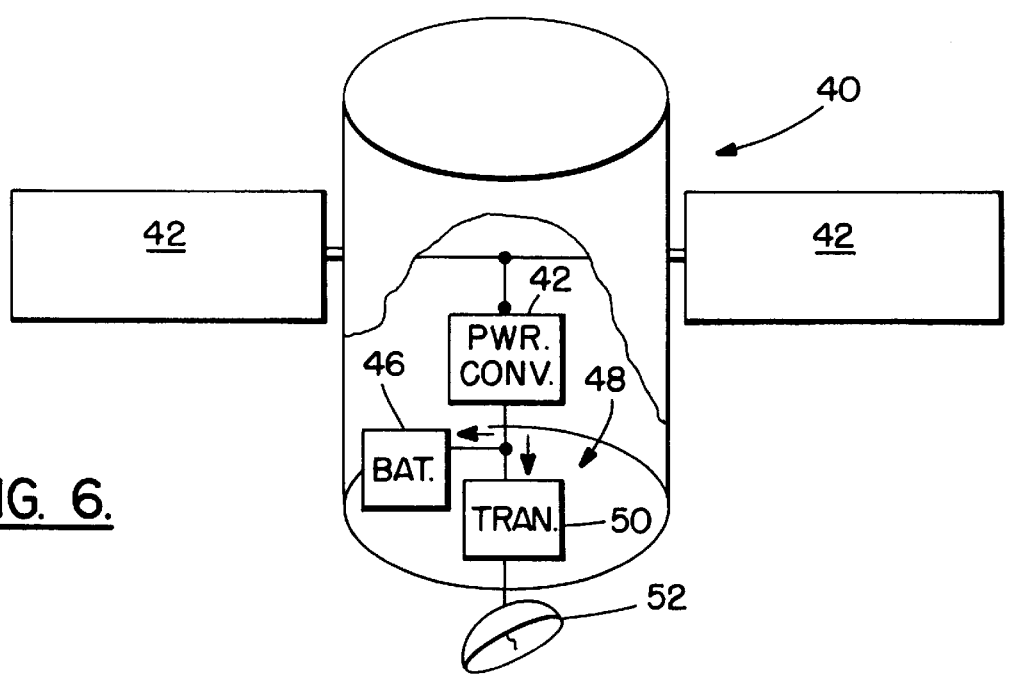
FIG. 6 illustrates a satellite constructed to have a PPT in accordance with the teaching of this invention.

An earth satellite 40 is depicted in a partially cut-away view in FIG. 6. The satellite 40 includes at least one solar array 42, at least one switching power converter 44 that is constructed in-accordance with this invention, at least one battery 46 that is charged by the power converter 44, and a load, for example a communications package 48 that includes a transceiver 50 coupled to at least one antenna 52. The load is powered from the solar array 42, and the battery 46 is charged, during periods when the solar array is illuminated by the sun. It is during this period that the peak power tracker of this invention operates, as described in detail above. During periods of non-illumination of the solar array 42 the battery 46 sources current to operate the load.

It should be noted that the circuit of FIG. 2 operates to extract a maximum available power from the solar arrays at the battery potential. The circuit senses the magnitude of the total output current from the power supply, the output current being shared between the load and the battery. Excess current, that is current that is not required by the load, flows into the battery to charge same.

It should further be noted that the teaching of this invention relates in general to a control system for a photovoltaic satellite power system, regardless of payload application or required power level. Furthermore, the teaching of this invention is also applicable to terrestrial power generation equipment, and is not limited solely to power supply or battery charging systems for spacecraft, such as low earth orbit satellites that carry a communications payload.

Thus, while the invention has been particularly shown and described with respect to a preferred embodiment thereof, it will be understood by those skilled in the art that changes in form and details may be made therein without departing from the scope and spirit of the invention. For example, other circuit configurations can be employed than those specifically illustrated, as can other pulse widths, frequencies, and the like, while still obtaining substantially the same results. As such, the teaching of this invention is not intended to be limited to only the embodiments or specific applications that are disclosed above.

What is claimed is:

1. A method for operating a pulse width modulated switching power converter having an input coupled to an output of a solar array and an output providing an output current, the output current being coupled to a battery for supplying a current $I_{CHARGE}$ to the battery and also coupled to a load for supplying a load current $I_{LOAD}$, comprising the steps of:

sensing a first magnitude of the output current, the output current comprising both $I_{CHARGE}$ and $I_{LOAD}$;

storing the sensed magnitude;

incrementally increasing a duty cycle of the pulse width modulated switching power converter to attempt to incrementally increase a magnitude of the output current of the switching power converter;

sensing a second magnitude of the output current; and comparing the stored first magnitude to the sensed second magnitude;

if the stored first magnitude is less than the sensed second magnitude, maintaining the duty cycle at a current duty cycle increment, else if the stored first magnitude is greater than the sensed second magnitude, decreasing the duty cycle;

wherein the method does not directly sense the output of the solar array while operating to maximize the charging current to the battery, and wherein the duty cycle of the pulse width modulated switching power converter is controlled only in accordance with the sensed output current.

2. A method as set forth in claim 1 wherein the step of incrementally increasing includes a step of periodically increasing a charge upon a capacitance, the capacitance being coupled to a pulse width control node of the pulse width modulated switching power converter, and wherein the step of decreasing the duty cycle includes a step of at least partially discharging the capacitance.

3. A pulse width modulated switching power converter having an input for coupling to an output of a solar array and an output for coupling an output current to a load that includes a battery, the output current comprising a battery charging component $I_{CHARGE}$ and a load component $I_{LOAD}$; comprising:

means for incrementally increasing a duty cycle of the pulse width modulated switching power converter so as to incrementally increase a magnitude of the output current of the switching power converter;

current sensing means coupled only to an output of the switching power converter, and not to the output of the solar array, for sensing a magnitude of both $I_{CHARGE}$ and $I_{LOAD}$;

means, having an input coupled to an output of the current sensing means and to an output of said means for incrementally increasing, for controlling the duty cycle of the pulse width modulated switching power converter in accordance with the sensed current;

means, having an input coupled to the output of the current sensing means, for periodically storing a sample of the sensed magnitude; and comparator means having a first input coupled to the output of the current sensing means and a second input coupled to an output of the storing means for comparing a previously stored magnitude to a presently sensed magnitude, said comparator means having an output coupled to an input of said means for incrementally increasing; wherein said means for incrementally increasing is responsive to said comparing means output for maintaining the duty cycle at a current duty cycle increment if the stored magnitude is indicated to be less than the presently sensed magnitude, and is further responsive to said comparing means output for decreasing the duty cycle if the stored magnitude is indicated to be greater than the presently sensed magnitude; and wherein said output of said solar array is not directly sensed while said pulse width modulated switching power converter operates to maximize the charging current to said battery.

4. A pulse width modulated switching power converter as set forth in claim 3 wherein said means for incrementally increasing includes means for periodically increasing a charge upon a capacitance, the capacitance being coupled to a pulse width control node of the pulse width modulated switching power converter, and further includes means, responsive to said comparing means output indicating that the stored magnitude is less than the presently sensed magnitude, for at least partially discharging the capacitance.

5. A pulse width modulated switching power converter having an input for coupling to an output of a solar array power source and an output for coupling to a load that includes a battery, comprising:

switching means having an input node for coupling to the output of the solar array power source and an output node for coupling to the load, said switching means having a control terminal;

pulse width modulator means having an input coupled to said control terminal for applying a pulse width modulated control signal to said control terminal for controlling a current flow through said switching means between said input node and said output node, said pulse width modulator means having a control input responsive to a signal for varying the duty cycle of the pulse width modulated control signal;

a capacitance coupled to the control input of the pulse width modulator means;

oscillator means having an output providing a signal for periodically applying a charge to said capacitance, the applied charge causing a change in potential across said capacitance and a corresponding increase in the duty cycle of the pulse width modulated control signal at the control terminal of said switching means;

current sensing means coupled only to the output node of the switching means, and not to said output of said solar array, for sensing a magnitude of the current flow through said switching means, the current flow through said switching means that is sensed by said current sensing means comprising a battery charging component $I_{CHARGE}$ and a load component $I_{LOAD}$;

sample and hold means, having an input coupled to an output of the current sensing means and a control input coupled to said output of said oscillator means, for periodically storing, in synchronism with said oscillator means output signal, a sample of the sensed magnitude of the current flow; and comparator means having a first input coupled to the output of the current sensing means and a second input coupled to an output of the storing means for comparing a previously stored magnitude of the current flow to a presently sensed magnitude of the current flow, said comparator means having an output coupled to said capacitance for at least partially discharging said capacitance, and thence decreasing the duty cycle of the pulse width modulated control signal at the control terminal of the switching means, upon detecting a condition wherein the stored magnitude of the current flow is determined to be greater than the presently sensed magnitude of the current flow; wherein the output of the solar array is not directly sensed while the pulse width modulated switching power converter operates to maximize the charge current to the battery.

6. An earth satellite comprising at least one solar array, at least one switching power converter, at least one battery that is charged by the at least one switching power converter, and a load, said switching power converter comprising:

a current control loop comprised of a pulse width modulator having an output providing a pulse width modulated signal to a control terminal of a switching device, said switching device being coupled between said at least one solar array and said at least one battery, said current control loop further comprising a current sensor coupled only to an output of said switching device, and not to an output the at least one solar array, for sensing a current output from said switching device, said current sensor having an output coupled to an input of said pulse width modulator for causing said pulse width modulator to vary the duty cycle of the pulse width modulated signal in accordance with the sensed output current, the output current that is sensed by said current sensor comprising a battery charging component $I_{CHARGE}$ and a load component $I_{LOAD}$; and a peak power tracker loop operating in parallel with said current control loop, said peak power tracker loop comprising means for periodically increasing the duty cycle of the pulse width modulated signal so as to periodically increase a magnitude of the output current of the switching device;

means, having an input coupled to an output of the current sensor, for periodically storing a sample of the sensed current; and comparator means having a first input coupled to the output of the current sensor and a second input coupled to an output of the storing means for comparing a value of a previous stored sample of the sensed current to a value of the presently sensed current, said comparator means having an output coupled to an input of said means for periodically increasing; wherein said means for periodically increasing is responsive to said comparing means output for maintaining the duty cycle at a current duty cycle increment if the value of the stored sample of the sensed current is indicated to be less than the value of the presently sensed current, and is further responsive to said comparing means output for decreasing the duty cycle if the value of the stored sample of the sensed current is indicated to be greater than the value of the presently sensed current, thereby operating said at least one solar array at or near a peak power point of said array; and wherein the output of said at least one solar array is not directly sensed while said pulse width modulated switching power converter operates to maximize the charging current to said battery.

7. An earth satellite as set forth in claim 6, wherein the load is comprised of a communications package that includes a transceiver coupled to at least one antenna.

8. An earth satellite as set forth in claim 6, wherein said earth satellite is a low earth orbit satellite.

* * * * *